United States Patent [19]

Hlavka

[11] 3,795,996

[45] Mar. 12, 1974

[54] CALENDAR FOR RECORDING BREEDING OF LIVESTOCK

[76] Inventor: Harold J. Hlavka, 402-4th Ave. N.W., New Prague, Minn. 56071

[22] Filed: July 14, 1972

[21] Appl. No.: 272,076

[52] U.S. Cl. .................................................. 40/107
[51] Int. Cl. .............................................. G09d 3/00
[58] Field of Search ............ 40/107, 109, 110, 118, 40/119; 283/2–4

[56] References Cited
UNITED STATES PATENTS

| | | |
|---|---|---|
| 467,118 | 1/1892 | Hawkins .................................. 283/2 |
| 2,788,173 | 4/1957 | Lovelady .............................. 40/107 |
| 3,406,474 | 10/1968 | Bates .................................... 40/110 |
| 3,570,448 | 3/1971 | Gates ................................. 40/110 X |
| 3,579,884 | 5/1971 | Bray ..................................... 40/110 |

*Primary Examiner*—Robert W. Michell
*Assistant Examiner*—J. H. Wolff
*Attorney, Agent, or Firm*—Merchant, Gould, Smith & Edell

[57] ABSTRACT

A calendar for keeping records of the condition of breeding stock and including calendar pages in a folded arrangement enabling a livestock breeder to note dates for breeding, young-bearing, and other data relative to the breeding of livestock.

3 Claims, 3 Drawing Figures

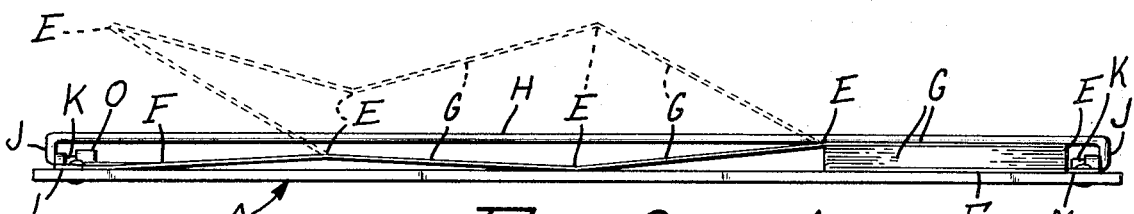

CALENDAR FOR RECORDING BREEDING OF LIVESTOCK

BACKGROUND OF THE INVENTION

Heretofore, records of heat periods, service of animals, and gestation times, have been kept on regular calendars where only a few animals are involved. Where record has been kept of a larger number of animals, the stockman or farmer has used one or more notebooks which often require much page turning and hunting to find desired information; or extensive cross-reference systems are used, involving substantial time and labor.

SUMMARY OF THE INVENTION

An important object of this invention is the provision of a calendar for livestock breeders, in which pertinent information may be easily placed and in which such information is easily found when later desired.

Another object of this invention is the provision of a calendar in which a stock breeder can tell at a glance when any one of a plurality of female animals will be in heat, and when births are expected.

To these ends, I provide a calendar comprising a backing member of relatively stiff sheet material and an elongated sheet of flexible material, such as paper, folded along parallel transverse fold-lines in fan or accordion fashion to provide a multiplicity of connected calendar pages of substantially equal width. The pages at the opposite ends of the sheet are fastened to the backing member in laterally spaced apart relationship a distance equal to the combined width of at least two pages, so that at least two pairs of pages are exposed at any given time and disposed in a substantially flat plane generally parallel to the plane of the backing member. The calendar pages each have calendar dates imprinted in a column adjacent one of the foldlines and define a space for notes adjacent each calendar date. The number of calendar dates on each page is equal to the number on the other pages and to the average number of days between heat periods of the species of animals for record of which the calendar is intended. Each calendar date on one page from the top to the bottom thereof is horizontally aligned with corresponding dates on the other pages, so that dates spaced apart said average number of days are all in a single horizontal line for easy reference. A holding device, mounted on the backing member releasably holds the exposed pages in a generally flat plane and the unexposed folded pages between the exposed pages and the front surface of the backing member.

DESCRIPTION OF THE DRAWING

FIG. 1 is a view in front elevation of a calendar produced in accordance with this invention;

FIG. 2 is a view in bottom plan, as seen from the line 2—2 of FIG. 1; and

FIG. 3 is a fragmentary view corresponding to a portion of FIG. 1, but showing a different position of some of the parts.

DETAILED DESCRIPTION OF THE PREFERRED EMBODIMENT

A rectangular backing member of relatively rigid or stiff material, such as cardboard, is indicated generally at A, and is provided adjacent its upper edge with an opening B whereby the member A may be suspended from a hook, nail, string or the like, not shown. On its front surface, and adjacent its upper and lower edges, the backing member A has imprinted thereon monthly calendars C, of the usual type. An elongated rectangular sheet D is folded along transverse parallel fold-lines E in fan or accordion type folds to provide a pair of end calendar pages F at opposite ends of the sheet D and a plurality of intermediate pages G between the end pages F. The several pages F and G are of equal width, the end pages F being glued or otherwise rigidly fastened to the backing member A adjacent the opposite side edges of the backing member A. In the embodiment illustrated, the end pages F are spaced apart a distance equal to the combined width of a pair of pages F or G so that two pairs of pages G or combinations of pages F and G, are exposed at one time in a substantially flat plane generally parallel to the plane of the backing member A. In FIG. 1, the calendar sheet D is arranged so that the left-hand page F and adjacent pages G are exposed, to show the beginning of a calendar year and a portion of the last month of a preceding year. In FIG. 3, the calendar pages F and G are arranged to expose the final months of the calendar year and at least a portion of the first month of a succeeding year. With the calendar sheet D disposed as in FIGS. 1 and 2, most of the pages G and the right-hand page F are folded flat between one of the pages G and the backing member A adjacent the right-hand edge of the backing member A. It will be appreciated that, at the end of the calendar year, most of the pages G will be in folded relationship adjacent the left-hand edge of the backing member A.

Means for releasably holding the several calendar pages G and F in desired folded and exposed relationship is provided. In the embodiment shown, this means includes an elongated holder element H that extends generally horizontally across the calendar and which at its opposite ends is formed to provide parallel arms J that extend upwardly and which have in-turned fingers or shaft portions K each journaled in a different bearing bracket L and M riveted or otherwise rigidly secured to the backing member A adjacent opposite side edges thereof. One in-turned shaft portion or finger K is provided with an angular displaced extension portion N that is engaged by a leaf-spring O that urges the holder element H in a direction toward engagement with the calendar sheet D adjacent the upper edge of the sheet D to releasably hold the calendar pages G in substantially flat condition against the backing member A. As shown in FIG. 1, the holder element H is adapted to be pivotally moved on the aligned axis of the fingers or shaft portions K between an operative calendar page holding position shown by full lines in FIG. 1, and an inoperative position shown by dotted lines in FIG. 1. In the inoperative dotted line position of the holder element H, the calendar pages G are free to be advanced, by folding the first or left-hand page G over the left-hand calendar page F and unfolding the right-hand page G from its underlying calendar page, as indicated by dotted lines in FIG. 2. Obviously, during the calendar year, the pages may be unfolded and folded in either direction to review information entered on other calendar pages F and G. When the calendar pages F and G are positioned as desired, relative to each other, the holder element H is manually swung downwardly to its full line position of FIG. 1 to hold the calendar pages in their desired exposed positions.

The calendar sheet D is provided with all of the calendar dates of a given year in succession, together with the calendar dates of at least a portion of the last month of the preceding year, and at least a portion of the first month of the next succeeding year. Each of the pages F and G has a given number of the calendar dates listed thereon in said succession, the number of calendar dates on each page being equal to the number of calendar dates on the other pages of the sheet D. The number of calendar dates on each page is equal to the average number of days between heat periods of a given livestock species. In the embodiment illustrated, each page F and G contains a total of 21 calendar dates, this calendar being suitable for the recording of data concerning mares, cows and sows, in view of the fact that these animals have an average of 21 days between heat periods. Preferably, and as shown in FIGS. 1 and 3, the calendar dates are listed adjacent the left-hand edge of each sheet F and G, and adjacent the fold-lines E thereof, and each page is lined to provide spaces in which may be noted breeding times and due dates of various animals, as well as other pertinent data. Further, each calendar date on each page F and G is on a common level with a corresponding calendar date or day of every other page of the calendar, so that the stockman or farmer has ready access to noted information concerning any given animal over a period of months, simply by turning over various pages G of the calendar sheet D. For convenience, given days of the week, such as Sunday, are emphasized, either by color coding or by placing the dates in rectangular boxes, as indicated at P. Also, it will be appreciated that the calendar dates of different months might be color coded for easy identification.

While the calendar illustrated in FIGS. 1–3 is shown as having 21 calendar dates on each page F and G thereof, it will be appreciated that the calendar sheet D may be provided having pages with 16 calendar dates on each page thereof, for use by persons breeding and raising sheep and goats, 16 being the average number of days between heat periods of the females of these species.

It will be noted that the upper end of each page F and G is marked as to the month or months of the calendar dates contained thereon, as well as the words "Bred" and "Due." Under these words, the stockman or farmer may write the names or numbers of the animals serviced and the approximate due dates of young-bearing. Knowing the average period of gestation, it is an easy matter for the operator to turn the calendar pages over to the one containing the due date and mark the same on that page. In this manner, the operator will be reminded of the due date well in advance thereof, and make the necessary preparations.

While I have shown and described a commercial embodiment of my calendar for recording the breeding of livestock, it will be understood that the same is capable of modification without departure from the spirit and scope of the invention, as defined in the claims.

What is claimed is:

1. A livestock breeding calendar comprising:
   a. a rectangular backing member of relatively rigid sheet material;
   b. an elongated rectangular sheet of flexible material folded along transverse parallel fold-lines in accordion fashion to provide a plurality of connected calendar pages of equal width;
   c. the calendar pages at the opposite ends of said sheet having means whereby they are fastened to said backing member in spaced apart relationship;
   d. said fastened pages being spaced apart a distance equal to the total width of at least two of said pages, whereby at least four successive pages may be disposed in unfolded exposed relationship relative to each other;
   e. and means for releasably holding said exposed pages in said unfolded relationship and the folded portions of said sheet in folded relationship between at least one of said unfolded pages and said backing member;
   f. said calendar pages each being divided into columns of equi-spaced segments, with each of said segments representing a single calendar day and bearing a different calendar date, the number of segments of each page being equal and representing the average number of days between heat periods of a given livestock species, said columnar calendar dates continuing in unbroken succession, seriatim, throughout said pages, whereby, data relative to the breeding of livestock in any one segment is readily correlated with the corresponding breeding date of the next cycle which is disposed in the same row on the next adjacent exposed calendar page.

2. The livestock breeding calendar defined in claim 1 in which each page contains a column of twenty-one consecutive dates, there being a sufficient number of pages in said sheet thereof to contain at least thirteen months of said calendar dates.

3. The livestock breeding calendar defined in claim 1 in which said means comprises an elongated holding member mounted on said backing sheet for movements toward and away from an oper-ative sheet-engaging position wherein said holding member extends across and engages the exposed surfaces of said unfolded sheets to hold said unfolded sheets in unfolded relationship therebetween and said backing sheet.

* * * * *